United States Patent Office 3,384,666
Patented May 21, 1968

3,384,666
CATALYST PELLET STABILIZATION IN THE CONTINUOUS PREPARATION OF IMINOBISPROPYL AMINES
Myrl Lichtenwalter, Austin, Tex., assignor to Jefferson Chemical Company, Inc., Houston, Tex., a corporation of Delaware
No Drawing. Filed Dec. 4, 1964, Ser. No. 416,117
4 Claims. (Cl. 260—583)

ABSTRACT OF THE DISCLOSURE

The pellets of a catalyst are protected against deterioration in the continuous production of iminobispropylamine or methyliminobispropylamine from the corresponding iminobispropionitrile with ammonia in the presence of hydrogen and a three-component hydrogenation catalyst consisting essentially of:

A. 60–85 mole percent of nickel or cobalt,
B. 14–37 mol percent of copper, and
C. 1–5 mol percent of chromium oxide, manganese oxide, molybdenum oxide or thorium oxide by conducting the reaction in methanolic solution in the presence of a minor amount of a hydroxide or alkoxide of sodium, lithium or potassium.

---

This invention relates to a method for stabilizing pellets of a hydrogenation catalyst from deterioration in use. More particularly, this invention relates to a method for inhibiting the disintegration of the pellets of a hydrogenation catalyst during the production of propylamines from their corresponding nitriles.

In copending allowed Moss et al. application, Ser. No. 112,926, filed May 26, 1961, now United States Patent No. 3,151,115 and entitled, "Method for the Simultaneous Production of Acyclic and Polycyclic Amines," and in copending allowed Moss application, Ser. No. 34,623, filed June 8, 1960, now United States Patent No. 3,152,-998 and entitled, "Method for Preparing Heterocyclic Compounds and Catalyst Therefor," there is disclosed a class of hydrogenation catalysts that is particularly efficacious in pelleted form for the preparation of piperazine and N-aminoethylpiperazine from monoethanolamine.

The catalyst disclosed in said references is preferably a three-compound catalyst containing from about 60 to about 85 mol percent of a first component selected from the class consisting of nickel and cobalt, from about 14 to 37 mol percent of copper and from about 1 to about 5 mol percent of a third non-reducible metal oxide component selected from the group consisting of chromium oxide, manganese oxide, molybdenum oxide and thorium oxide. More preferably, the catalyst will be composed of about 72 to about 78 mol percent of the first component, about 20 to about 25 mol percent of the second component and about 1 to about 3 mol percent of the third component.

The catalyst is suitably prepared from mixtures of oxides of metals by well known techniques. For example, soluble salts such as the nitrates of nickel, colbalt, copper and the third component may be prepared in an aqueous solution and precipitated therefrom as carbonates by the addition of solid ammonium carbonate. The precipitate, after being recovered, washed and dried, is calcined at a temperature in the range from about 300° to about 400° C., until the carbonate salts have been converted to the corresponding oxides. The mixture of oxides is then pelleted and the pellets are reduced in the presence of molecular hydrogen at a temperature within the range of about 250° to about 400° C. until about 30% to about 100% of the nickel oxide has been reduced to metallic nickel. As a consequence, the copper will have been reduced to metallic copper. However, under such conditions, the third component will still be present as an oxide.

Catalyst pellets of this nature are extremely hard and durable and disintegrate slowly, if at all, when used in the preparation of heterocyclic amines from aliphatic amines in alkanolamines under conditions of high temperature and pressure in the presence of water and ammonia.

In further work that I have done in connection with the utilization of a catalyst of the class described, I have surprisingly discovered that pelleted catalysts of this class tend to disintegrate when used in the hydrogenation of propionitriles to the corresponding propylamines. Thus, I have discovered that under the reaction conditions that are necessary for the hydrogenation of the nitrile groups to amino groups, the catalyst pellets are swollen or disintegrate into fine particles, or both. I wish to emphasize that the phenomenon that occurs is not a phenomenon which destroys the effectiveness of the catalyst, as such. Thus, the fine particles that remain after disintegration of the pelleted catalysts retain their catalytic activity.

However, the physical integrity of the catalyst pellets is lost. For this reason, I have indicated in the title that the method of the present invention is directed to a method for stabilizing catalyst pellets.

In accordance with the present invention, I have discovered that the foregoing problem can be overcome when a propionitrile is hydrogenated in the presence of a catalyst of the class described at a temperature within the range of from about 80° to about 200° C. (more preferably, about 110° to 130° C.) and a pressure within the range of from about 30 to about 400 atmospheres (such as a pressure of 2,500 to 3,500 p.s.i.g.) in the presence of hydrogen and ammonia and in the added presence of from about 0.5% to about 1.0% of a base selected from the class consisting of the hydroxides and alkoxides of sodium, lithium, and potassium, such as sodium hydroxide, sodium ethoxide, sodium methoxide and the corresponding lithium and potassium compounds.

The iminobispropionitrile feed stocks to be converted in accordance with the present invention are prepared by the reaction of acrylonitrile with an initiator such as ammonia, methylamine, ethylamine, etc.

The reaction may be conducted in solution in a solvent (e.g., methanol or ethanol). The concentration of the feed stock in the solvent may suitably range from 20% to 100%.

In conducting the hydrogenation reaction, the molar ratio of ammonia to iminobispropionitrile is suitably such that there are from about 2 to about 20 mols of ammonia present per propionitrile group. Hydrogen is employed in amounts such that the hydrogen partial pressure constitutes at least 20, and more preferably, more than 60 atmospheres partial pressure of hydrogen. Preferably, the hydrogen partial pressure will amount to from about 60% to 80% of the total pressure. In a continuous process to which the process of the present invention is primarily directed, the space velocity is suitably from about 0.5 to about 5 pounds of feed per pound of catalyst per hour.

The propionitriles to be treated in accordance with the present invention are conveniently prepared by reacting acrylonitrile with an amine such as ammonia, methylamine, dimethyl amine, piperazine, morpholine, ethylene diamine, monoethanolamine, etc., to provide the corresponding propionitriles.

The invention will be further illustrated in connection with the following examples, which are given by way of illustration and not as limitations on the scope of this invention.

Example I.—Catalyst stabilization with strong bases

A series of liquid phase, continuous process runs was made with nickel-copper-chrome and cobalt-copper-chrome hydrogenation/dehydrogenation catalysts. The catalyst contained about 75 mol percent of either nickel or cobalt, about 22 mol percent of copper and about 3 mol percent of chromium. These runs were made to determine catalyst activity and stability during hydrogenation of nitriles to amines and were made with and without a strong base being present. The nitrile (iminodipropionitrile or methyliminodipropionitrile) was added to the bottom of the reactor as a 50% methanolic solution. Ammonia was added in the same manner for the purpose of decreasing secondary amine formation (molar ratio $NH_3$/nitrile was 10:1). The space velocity was 1.0 g. total liquid feed/ml. catalyst-hour in all the runs. When a strong base was used, the base was dissolved in the nitrile solution. The base was sodium methoxide or sodium hydroxide in 0.5–1% concentration. Conversion of nitrile was >99% during all the runs, and the conversion remained high until the reactor plugged. The runs are summarized in Table 2. In Runs 1, 3 and 5, no strong base was present, and the catalyst was quickly broken down to "fines" which caused the reactor to plug. Runs 2, 4 and 6 were made with 1% sodium methoxide, based on the weight of the nitrile, present in the feed, and the catalyst life was greatly increased as the reactor did not plug during any of the runs. The actual catalyst life was not determined because of the length of time required. It is evident that catalyst stability was greatly improved by incorporation of the strong alkali.

TABLE 1

| Run | Catalyst | Nitrile¹ | Base | Catalyst life, hrs. |
|---|---|---|---|---|
| 1 | Ni-Cu-Cr | IBPN | NaOCH³ | 200 |
| 2 | Co-Cu-Cr | IBPN | None | 45 |
| 3 | Co-Cu-Cr | IBPN | NaOCH³ | 400 |
| 4 | Co-Cu-Cr | MIBPN | None | 80 |
| 5 | Co-Cu-Cr | MIPBN | NaOCH³ | 100 |
| 6 | Ni-Cu-Cr | MIPBN | None | 32 |

¹ IBPN—iminodipropionitrile or MIBPN—methyliminodipropionitrile.

Having thus described my invention, what is claimed is:

1. A method for preparing iminobispropylamine using a pelleted catalyst which comprises contacting a methanolic solution of iminobispropionitrile with a pelleted hydrogenation catalyst on a continuous basis under reaction conditions including a temperature within the range of from about 80° to about 200° C. and a pressure of about 30 to about 400 atmospheres in the additional presence of hydrogen, from about 2 to about 12 mols of ammonia per mol equivalent of nitrile group and a base selected from the class consisting of the hydroxides and alkoxides of sodium, potassium and lithium, whereby catalyst pellet disintegration is inhibited, the catalytically active component of the said catalyst consisting essentially of from about 60 to about 85 mol percent of a first component of the class consisting of nickel and cobalt, from about 14 to about 37 mol percent of copper and from about 1 to about 5 mol percent of a third non-reducible metal oxide component selected from the group consisting of chromium oxide, manganese oxide, molybdenum oxide and thorium oxide.

2. A method as in claim 1 wherein the reaction conditions include a temperature of about 110° to 130° C. and a pressure within the range of about 2,500 to about 3,500 p.s.i.g.

3. A method for preparing methyliminobispropylamine using a pelleted catalyst which comprises contacting a methanolic solution of methyliminobispropionitrile with a pelleted hydrogenation catalyst on a continuous basis under reaction conditions including a temperature within the range of from about 80° to about 200° C. and a pressure of about 30 to about 400 atmospheres in the additional presence of hydrogen, from about 2 to about 12 mols of ammonia per mol equivalent of nitrile group and a base selected from the class consisting of the hydroxides and alkoxides of sodium, potassium and lithium, whereby catalyst pellet disintegration is inhibited, the catalytically active component of the said catalyst consisting essentially of from about 60 to about 85 mol percent of a first component of the class consisting of nickel and cobalt, from about 14 to about 37 mol percent of copper and from about 1 to about 5 mol percent of a third non-reducible metal oxide component selected from the group consisting of chromium oxide, manganese oxide, molybdenum oxide and thorium oxide.

4. A method as in claim 3 wherein the reaction conditions include a temperature of about 110° to 130° C. and a pressure within the range of about 2,500 to about 3,500 p.s.i.g.

References Cited

UNITED STATES PATENTS

| | | | |
|---|---|---|---|
| 2,166,971 | 7/1939 | Schmidt et al. | 260—583 |
| 2,225,059 | 12/1940 | Lazier | 260—583 |
| 2,811,556 | 10/1957 | Shapiro | 260—583 |
| 3,210,426 | 10/1965 | Levy et al. | 260—583 |

FLOYD D. HIGEL, *Primary Examiner.*